US010872467B2

(12) United States Patent
Sun et al.

(10) Patent No.: US 10,872,467 B2
(45) Date of Patent: Dec. 22, 2020

(54) METHOD FOR DATA COLLECTION AND MODEL GENERATION OF HOUSE

(71) Applicant: KE.COM (BEIJING) TECHNOLOGY CO., LTD., Beijing (CN)

(72) Inventors: Xin Sun, Beijing (CN); Zhe Xie, Beijing (CN)

(73) Assignee: KE.COM (BEIJING) TECHNOLOGY CO., LTD., Beijing (CN)

(*) Notice: Subject to any disclaimer, the term of this patent is extended or adjusted under 35 U.S.C. 154(b) by 20 days.

(21) Appl. No.: 16/521,795

(22) Filed: Jul. 25, 2019

(65) Prior Publication Data

US 2019/0378330 A1 Dec. 12, 2019

Related U.S. Application Data

(63) Continuation of application No. PCT/CN2019/090179, filed on Jun. 5, 2019.

(30) Foreign Application Priority Data

Jun. 6, 2018 (CN) .......................... 2018 1 0574715

(51) Int. Cl.
*G06T 17/10* (2006.01)
*G06T 7/38* (2017.01)
(Continued)

(52) U.S. Cl.
CPC ............ *G06T 17/10* (2013.01); *G06K 9/6211* (2013.01); *G06T 7/38* (2017.01); *G06T 7/571* (2017.01); *G06T 19/20* (2013.01)

(58) Field of Classification Search
CPC ........... G06T 17/10; G06T 7/38; G06T 7/571; G06T 19/20; G06K 9/6211
See application file for complete search history.

(56) References Cited

U.S. PATENT DOCUMENTS 9,204,121 B1 12/2015 Marason et al.
2004/0159031 A1 8/2004 Chang
(Continued)

FOREIGN PATENT DOCUMENTS

CN 103530799 A 1/2014
CN 106296783 A 1/2017
(Continued)

OTHER PUBLICATIONS

Wei Lyu et al, A survey on image and video stitching, Virtual Reality & Intelligent Hardware, pp. 55-83 (Year: 2019).*
(Continued)

*Primary Examiner* — Phuc N Doan
(74) *Attorney, Agent, or Firm* — Veros Legal Solutions LLP (57) ABSTRACT

Embodiments of the present disclosure disclose a method for data collection and model generation of a house. According to the method, when a model of a house is to be established, both collected depth images of the house and pictures of the house are acquired. A virtual three-dimensional model of the house is created by using the depth images, and a panoramic image of a functional space is generated by using the pictures. When a user needs to learn about the structure of the house, the user can view the virtual three-dimensional model created from the depth images; and when the user needs to learn about specific details of a functional space, the user can view the panoramic image of the functional space. The details of a functional space of the house can be displayed, and the structure of the house can be displayed as well, which helps the user to fully learn about the house.

12 Claims, 6 Drawing Sheets

(51) Int. Cl.
  *G06T 19/20*   (2011.01)
  *G06K 9/62*    (2006.01)
  *G06T 7/571*   (2017.01)

(56) References Cited

U.S. PATENT DOCUMENTS

| | | | |
|---|---|---|---|
| 2013/0002649 A1* | 1/2013 | Wu | G06T 19/006 345/419 |
| 2014/0146057 A1 | 5/2014 | Kim et al. | |
| 2015/0320343 A1 | 11/2015 | Utsunomiya et al. | |
| 2016/0335809 A1* | 11/2016 | Forutanpour | G06T 7/579 |
| 2018/0139431 A1* | 5/2018 | Simek | H04N 13/254 |
| 2019/0026958 A1* | 1/2019 | Gausebeck | G06T 7/593 |
| 2019/0122378 A1* | 4/2019 | Aswin | G06T 5/003 |
| 2019/0378332 A1* | 12/2019 | Sun | G06T 15/04 |

FOREIGN PATENT DOCUMENTS

| | | | |
|---|---|---|---|
| CN | 106600711 A | 4/2017 | |
| CN | 106846485 A | 6/2017 | |
| CN | 107464286 | * 12/2017 | ............ G06T 17/20 |
| CN | 107465906 A | 12/2017 | |
| CN | 108496352 A | 9/2018 | |
| CN | 108876935 A | 11/2018 | |
| CN | 109064545 A | 12/2018 | |
| CN | 109215111 A | 1/2019 | |
| JP | 2014011720 | * 1/2014 | |

OTHER PUBLICATIONS

Camillio Taylor, Mapping with Depth Panoramas, IEEE/RSJ International Conference on Intelligent Robots and Systems, Hamburg (Germany), 2015. (Year: 2015).*

I-C Lee et al, Applications of panoramic images: from 720° panorama to interior 3D models of augmented reality, Indoor-Outdoor Seamless Modelling, Mapping and Navigation, May 21-22, 2015, Tokyo, Japan (Year: 2015).*

Tomi Kyostila, Merging Overlapping Depth Maps into a Nonredundant Point Cloud (Year: 2013).*

* cited by examiner

METHOD FOR DATA COLLECTION AND MODEL GENERATION OF HOUSE

CROSS-REFERENCE TO RELATED APPLICATIONS

This application is a continuation of International Application No. PCT/CN2019/090179, filed on Jun. 5, 2019, which claims priority to Chinese Patent Application No. 201810574715.6, filed on Jun. 6, 2018. The disclosures of the aforementioned applications are herein incorporated by reference in their entireties.

TECHNICAL FIELD

Embodiments of the present disclosure relate to the technical field of virtual three-dimensional (3D) modeling, and particularly to a method for data collection and model generation of a house.

BACKGROUND

In a process of virtual three-dimensional modeling of a house, image collection is often performed by a depth camera. The depth camera is a device capable of measuring a distance between each photographing spot and the camera, for example, a camera that measures a distance between a photographing spot and the camera through the principle of structured light. The basic principle of structured light technique is as follows: a grating is placed outside a laser, and laser is refracted when being projected by the grating for imaging, so that the falling point of laser on a surface of an object is eventually displaced. When the object is closer to a laser projector, the displacement caused by refraction is small; and when the object is farther from the laser projector, the displacement caused by refraction is correspondingly increased. A camera is used to detect and collect a pattern projected onto the surface of the object. Through a change in displacement of the pattern, the position and depth information of the object can be calculated with an algorithm, so that the entire virtual three-dimensional space is recovered. Generally, a model map of a house is established with depth image collection. However, details of each functional space of the house cannot be collected finely during the depth image collection, so that a user is unable to comprehensively learn about each functional space of the house.

SUMMARY

An objective of the present disclosure is to provide a method for data collection and model generation of a house.

In an aspect of the present disclosure, a method for data collection and model generation of a house is provided, the method comprising:

employing a processor that facilitates execution of computer executable instructions stored on a non-transitory computer readable medium to implement operations, the operations comprising:

acquiring collected depth images and pictures of each of at least one functional space of a preset house;

creating a virtual 3D model of the preset house based on the depth images of the at least one functional space, and generating a panoramic image of each of the at least one functional space based on the pictures of the functional space; and sending, when request information indicating displaying the preset house is received, the virtual 3D model of the preset house or a panoramic image of a target functional space corresponding to the request information, according to the request information.

In another aspect of the present disclosure, an electronic device is provided, the electronic device comprising:

at least one processor, at least one memory, a communication interface and a bus, wherein the processor, the memory, and the communication interface communicate with one another through the bus;

the communication interface is used for information transmission between the electronic device and a communication apparatus of a terminal device; and the memory stores program instructions executable by the processor, the processor executing the program instructions to perform the method corresponding to a terminal device.

In a further aspect of the present disclosure, a non-transitory computer readable storage medium is provided, which stores computer instructions that cause a computer to perform the method corresponding to a terminal device.

BRIEF DESCRIPTION OF THE DRAWINGS

To describe technical solutions in embodiments of the present disclosure or in the prior art more clearly, accompanying drawings to be used for description of the embodiments of the present disclosure or the prior art will be briefly introduced below. Apparently, the accompanying drawings in the following description show some embodiments of the present disclosure, and those of ordinary skill in the art may derive other drawings from these accompanying drawings.

DETAILED DESCRIPTION OF EMBODIMENTS

In order to make the objectives, technical solutions and advantages of embodiments of the present disclosure clearer, the technical solutions in embodiments of the present disclosure will be clearly and completely described below with reference to the accompanying drawings in the embodiments of the present disclosure. Apparently, the described embodiments are a part, but not all of the embodiments of the present disclosure. All other embodiments obtained by those of ordinary skill in the art based on the embodiments of the present disclosure without any creative effort shall fall within the protection scope of the present disclosure.

Figure 1:
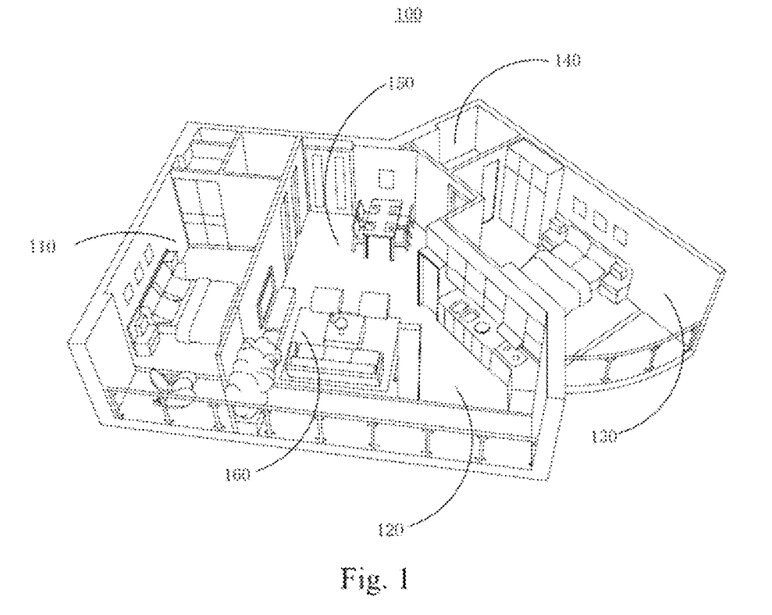
FIG. 1 is a schematic diagram illustrating an exemplary three-dimension virtual reality (VR) environment according to an embodiment of the present disclosure.

FIG. 1 illustrates an exemplary three-dimension virtual reality (VR) environment 100 according to an embodiment of the present disclosure. As shown in FIG. 1, 3D VR environment 100 may simulate or represent a residential unit, such as an apartment or house floor. It is noted that 3D VR environment 100 may include a VR representation of any in-door space or environment. Referring to FIG. 1, 3D VR environment 100 may include one or more functional spaces, such as 110, 120, 130, 140, 150, and 160. As used herein, a functional space refers to an enclosed or partially enclosed space that is associated with a particular function. In some cases, a functional space may correspond to a room. For example, functional space 110 may correspond to a first bedroom, and functional space 130 may correspond to a second bedroom. In some cases, a functional space may correspond to an enclosed or partially enclosed space within or adjacent to a room. For example, functional space 140 may correspond to a closet. In some cases, a function space may correspond to an area that is generally used for a specific purpose. For example, functional space 120 may correspond to a kitchen area, functional space 150 may correspond to a dining area, and functional space 160 may correspond to a living room. Although functional spaces 120, 150, and 160 may share the same room (e.g., an enclosed area), they may be considered as different functional spaces due to their different functions.

Figure 2:
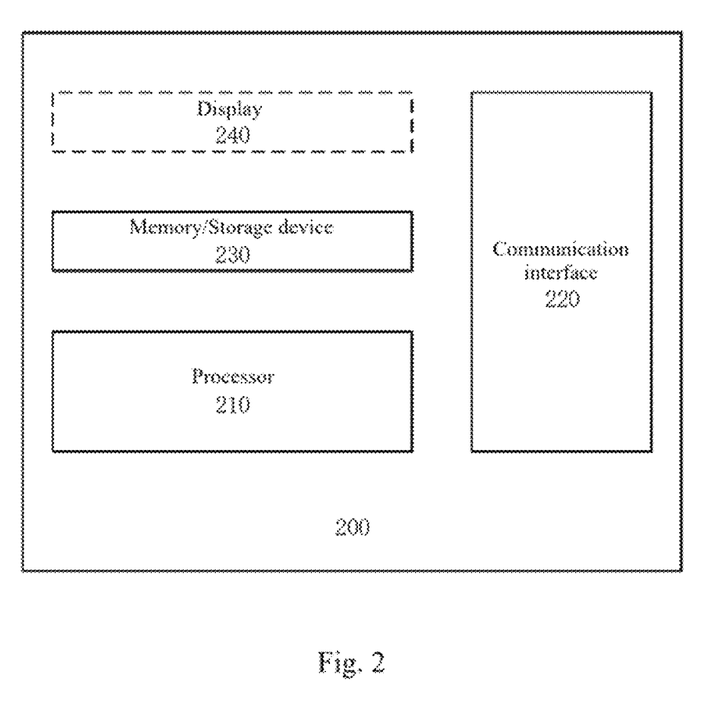
FIG. 2 is a block diagram illustrating an exemplary computer system according to an embodiment of the present disclosure.

FIG. 2 illustrates a block diagram of an exemplary computer system 200 configured to implement various functions disclosed herein. For example, computer system 200 may be configured as a server to create or reconstruct VR environment 100. In another example, computer system 200 may be configured as terminal device to display or enrich VR environment 100. As shown in FIG. 2, computer system 200 may include a processor 210, a communication interface 220, a memory/storage 230, and a display 240. Memory/storage 230 may be configured to store computer-readable instructions that, when executed by processor 210, can cause processor 210 to perform various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

Processor 210 may be configured to perform the operations in accordance with the instructions stored in memory 230. Processor 210 may include any appropriate type of general-purpose or dedicated microprocessor, digital signal processor, microcontroller, or the like. Processor 210 may be configured as a separate processor module dedicated to performing one or more specific operations disclosed herein. Alternatively, processor 210 may be configured as a shared processor module for capable of performing other operations unrelated to the one or more specific operations disclosed herein.

Communication interface 220 may be configured to communicate information between computer system 200 and other devices or systems. For example, communication interface 220 may include an integrated service digital network (ISDN) card, a cable modem, a satellite modem, or a modem to provide a data communication connection. As another example, communication interface 220 may include a local area network (LAN) card to provide a data communication connection to a compatible LAN. As a further example, communication interface 220 may include a high-speed network adapter such as a fiber optic network adaptor, 10 G Ethernet adaptor, or the like. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 220 may also include various I/O devices such as a keyboard, a mouse, a touchpad, a touch screen, a microphone, a camera, a biosensor, etc. A user may input data to a terminal device through communication interface 220.

Display 240 may be integrated as part of computer system 200 or may be provided as a separate device communicatively coupled to computer system 200. Display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 240 may include a VR goggle, a pair of VR glasses, or other similar devices that provide immersive VR experience. For example, VR environment 100 may be displayed on display 240. In some embodiments, display 240 may be integrated as part of communication interface 220.

Figure 3:
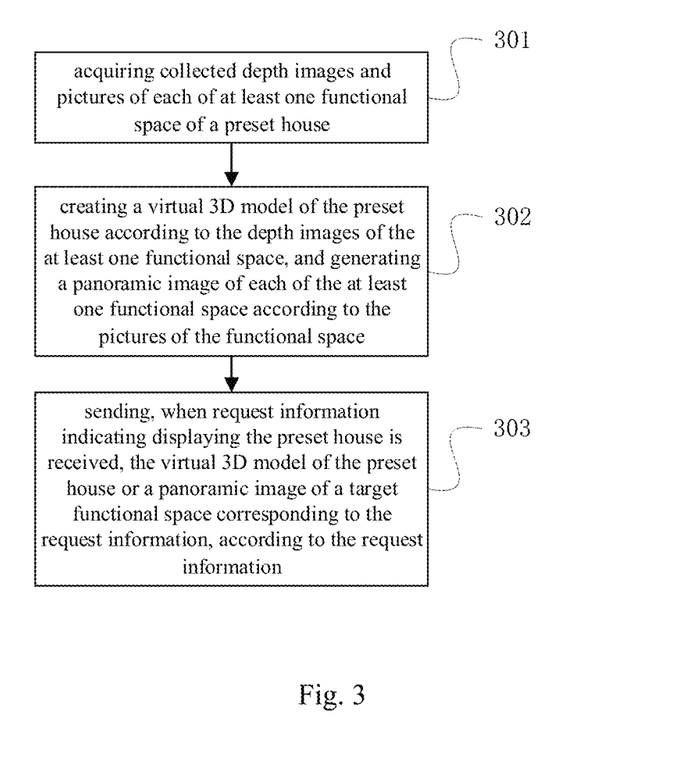
FIG. 3 is a schematic flow diagram of a method for data collection and model generation of a house according to an embodiment of the present disclosure.

FIG. 3 is a schematic flow diagram of a method for data collection and model generation of a house according to an embodiment of the present disclosure. Referring to FIG. 3, the method comprises:

301: acquiring collected depth images and pictures of each of at least one functional space of a preset house;

302: creating a virtual 3D model of the preset house based on the depth images of the at least one functional space, and generating a panoramic image of each of the at least one functional space based on the pictures of the functional space; and 303: sending, when request information indicating displaying the preset house is received, the virtual 3D model of the preset house or a panoramic image of a target functional space corresponding to the request information, according to the request information.

The method according to the embodiment can be performed by a device capable of performing the method, for example, a processor or a server. The house that requires data collection can include one or more functional spaces. For example, the house can include a plurality of functional spaces, such as a living room, a bedroom, a dining room, a kitchen, and a bathroom. When data collection is performed for the house including a plurality of functional spaces, data collection can be performed on each of the plurality of functional spaces, or on only one of or some of the plurality of functional spaces. For example, if the house includes a living room, a bedroom, a dining room, a kitchen, and a bathroom, data collection can be performed only on the living room to obtain depth images and pictures of the living room, a virtual 3D model of the house including the living room is created based on the depth images of the living room, and a panoramic image of the living room is generated based on the pictures of the living room. Alternatively, data collection can also be performed on both the living room and the bedroom, so that a virtual 3D model of the house including the living room and the bedroom is obtained based on the depth images of the living room and the depth images of the bedroom, a panoramic image of the living room is generated based on the pictures of the living room, and a panoramic image of the bedroom is generated based on the pictures of the bedroom. Of course, data collection can also be performed on all the functional spaces of the house, a virtual 3D model of the house including all the functional spaces is created based on the depth images of all the functional spaces, and based on the pictures of each of the functional spaces, a panoramic image of the functional space is generated.

Depth images can be obtained by collecting data of the house with a depth camera. Pictures can be obtained by photographing a functional space with a common camera. A collected depth image can be converted into a point cloud image (also referred to as point cloud model). If there are a plurality of depth images, a plurality of point cloud images converted from the plurality of depth images can be stitched and merged. The conversion of depth images into point cloud images and the stitching and merging of the plurality of point cloud images can be implemented by calculating, for example, with a point cloud stitching and merging function (e.g., PCL) in an open source library. The generation of a panoramic image from pictures can be implemented by an image stitching technique (e.g., synthesizing the pictures into a panoramic image via opencv). When a user needs to learn about the structure of the house, the virtual 3D model can be acquired by sending, through a terminal device, request information indicating that the virtual 3D model of the house is to be viewed. When a user needs to learn about a partial detail drawing of a functional space, the partial details of the functional space can be learned about by sending corresponding request information through the terminal device.

The embodiment provides a method for data collection and model generation of a house. According to the method, when a virtual model of a house is to be established, both collected depth images of the house and pictures of the house are acquired. A virtual three-dimensional model of the house is created by using the depth images, and a panoramic image of each functional space is generated by using the pictures. When a user needs to learn about the structure of the house, the user can view the virtual three-dimensional model created from the depth images; and when the user needs to learn about specific details of a functional space, the user can view the panoramic image of the functional space. Hence, the details of each functional space of the house can be displayed while the structure of the house is displayed, which helps the user to fully learn about the house.

Further, on the basis of the above embodiments, collection of the depth images and the pictures of each of the at least one functional space of the preset house can comprise: for each functional space, photographing the functional space by taking a plurality of photographing spots in the functional space as centers, respectively, to obtain the depth images and the pictures of the functional space.

The depth images of the functional space can be obtained, for example, by performing photographing with a depth camera.

When creating a model for the house, a virtual model of the house can be created based on the acquired comprehensive information of the house. Thus, when a functional space is photographed at a photographing spot in the functional space, the functional space can be photographed at a plurality of angles, by taking, for example, the photographing spot as a center. For example, a plurality of photographing spots can be selected in each functional space. At each photographing spot, the functional space can be photographed at a plurality of angles, by taking the photographing spot as a center. For example, by taking the photographing spot as the center, photographing can be performed respectively at angles of 0, 90, 180, and 270 degrees, or 360-degree continuous surround photographing can be performed. During photographing, depth images can be obtained by performing photographing with a depth camera, and pictures can be obtained by performing photographing with a common camera. Thus, information of the house at the angles obtained from the photographing spots can be acquired.

In the case of multi-angle photographing a functional space by taking a photographing spot as a center, a depth image corresponding to each of a plurality of angles can be obtained. Therefore, in this case, the depth image at the photographing spot can include a plurality of depth images respectively corresponding to the plurality of angles. During data processing, each of the plurality of depth images can be converted into a point cloud image, and the converted point cloud images are stitched and merged to obtain a point cloud image corresponding to the depth image at the photographing spot. For example, by taking a certain photographing spot as the center, photographing is performed respectively at angles of 0, 90, 180, and 270 degrees, such that a plurality of depth images respectively corresponding to 0, 90, 180, and 270 degrees can be obtained. Each of the plurality of depth images can be converted into a point cloud image, and the converted point cloud images are stitched and merged to obtain a point cloud image corresponding to the depth image at the photographing spot.

The embodiment provides a method for data collection and model generation of a house. Complete information can be provided for modeling by multi-directional photographing at each of a plurality of photographing spots.

Further, on the basis of the above embodiments, photographing the functional space by taking the plurality of photographing spots in the functional space as the centers, respectively, to obtain the depth images and the pictures of the functional space, comprises:

stitching and merging a point cloud image corresponding to a depth image that is obtained by photographing the functional space by taking a current photographing spot as a center, with a point cloud image corresponding to a depth image at a previous photographing spot where photographing has been performed, and obtaining, when the stitched and merged point cloud image covers each corner of the functional space, the depth images of the functional space based on the depth image at the current photographing spot and the depth image at the previous photographing spot where photographing has been performed; and performing re-photographing by taking the current photographing spot as the center or reselecting a photographing spot to perform photographing, when the stitched and merged point cloud image does not cover each corner of the functional space, until a point cloud image covering each corner of the functional space is obtained, and obtaining the depth images of the functional space based on depth images at all photographing spots where photographing has been performed.

Further, on the basis of the above embodiments, photographing the functional space by taking the plurality of photographing spots in the functional space as the centers, respectively, to obtain the depth images and the pictures of the functional space, further comprises:

photographing the functional space by taking each photographing spot, where photographing has been performed to obtain a depth image, as a center, to obtain a picture of the functional space that corresponds to each photographing spot where photographing has been performed to obtain the depth image.

The embodiment provides a method for data collection and model generation of a house. During photographing, a photographer can determine, in real time and according to the obtained point cloud image, whether a photographing spot needs to be adjusted or whether re-photographing needs to be performed, which provides a basis for creating a model later by using complete information of the house.

Further, on the basis of the above embodiments, sending, when the request information indicating displaying the preset house is received, the virtual 3D model of the preset house or the panoramic image of the target functional space corresponding to the request information, according to the request information, comprises:

sending, when the request information indicates displaying the virtual 3D model of the preset house, the virtual 3D model of the preset house to a terminal device corresponding to the request information; and sending, when the request information indicates displaying the panoramic image of the target functional space, a panoramic image at a preset default angle of view corresponding to the target functional space to the terminal device.

It should be noted that, a user can send, to a server through a terminal device, request information indicating whether the virtual 3D model of the preset house is to be displayed or a panoramic image of a certain functional space is to be displayed. After receiving the request information, the server sends a corresponding image to the terminal device according to the request information to meet user's needs.

For example, when a user clicks an operation button for displaying the virtual 3D model of the preset house on a screen, the terminal sends, to the server, request information indicating displaying the virtual 3D model of the preset house, and after receiving the request information, the server sends the virtual 3D model of the preset house to the terminal device to display the structure of the house to the user. When the user clicks for selection of a certain functional space of the house on the screen, an image of the functional space at a default angle of view is directly sent to the terminal device. The user can adjust the displayed image of the functional space at the default angle of view later.

The embodiment provides a method for data collection and model generation of a house, where corresponding contents can be displayed for different user request information, to provide house information that meets user's needs.

Further, on the basis of the above embodiments, after sending, when the request information indicates displaying the panoramic image of the target functional space, the panoramic image at the preset default angle of view corresponding to the target functional space to the terminal device, the method further comprises:

acquiring, when information indicating changing a current angle of view for display is received, a changed target angle of view, and sending a panoramic image corresponding to the target angle of view to the terminal device, wherein the information indicating changing the current angle of view for display comprises movement adjustment or zoom adjustment of the current angle of view for display, the movement adjustment being implemented by sliding a screen to left or right on the terminal device, and the zoom adjustment being implemented by a zoom operation on the terminal device.

In the process of displaying a certain functional space, the user can view images of different positions of the functional space by sliding the screen or performing a zoom operation on the screen.

The embodiment provides a method for data collection and model generation of a house, where a user can learn about different positions of the house in detail by operating a terminal device.

Further, on the basis of the above embodiments, the at least one functional space comprises a plurality of functional spaces, and the method further comprises: after sending, when the request information indicates displaying the panoramic image of the target functional space, the panoramic image at the preset default angle of view corresponding to the target functional space to the terminal device, sending, when information indicating skip to another functional space is received, a panoramic image at a preset default angle of view corresponding to said another functional space to the terminal device.

It can be understood that, when viewing a panoramic image of a preset house, the user can skip from one functional space to another functional space to view internal detailed information of any functional space that the user wants to learn about.

The embodiment provides a method for data collection and model generation of a house, where a user can switch the functional space or switch an angle of view when viewing a panoramic image of a certain functional space by a terminal device.

As a specific exemplary embodiment, an exemplary method is provided (the exemplary method provided in this exemplary embodiment is suitable for, for example, the case where the depth precision for indoor photographing is about 6 meters), which includes the following steps.

(1) Photographing are performed by using a hardware device with a depth camera and a common color camera, to obtain a 360-degree depth image (information) and a color picture at a corresponding position simultaneously every time.

(2) During photographing, a photographer can receive data obtained by performing photographing, through a hand-held mobile device.

(3) A point cloud image corresponding to the depth image obtained by photographing can be automatically stitched and merged with the existing point cloud image(s), or manually stitched and merged with the existing point cloud image(s) by the photographer.

(4) The photographer can perform photographing at a plurality of indoor photographing spots as needed, and can see the coverage by the point cloud image on the screen of the hand-held device or the hardware device for photographing.

(5) After the photographing is completed, a background system receives the data and performs optimization processing on the data to generate a virtual three-dimensional model of the house, and generates a panoramic image corresponding to each photographing spot by using common color pictures obtained by photographing at each photographing spot.

(6) During displaying, a user can select the virtual three-dimensional model of the house to view the state of the house as a whole. If the user is interested in details, the user can also choose to view the panoramic image corresponding to a specific photographing spot.

The method provided in this embodiment can not only fully display the three-dimensional structure of the house, but also effectively solve the problem that the three-dimensional model of the house is not sufficiently fine in a close-range situation.

According to another embodiment of the present disclosure, photographing the functional space by taking the plurality of photographing spots in the functional space as the centers, respectively, to obtain the depth images and the pictures of the functional space, can comprise: predicting a next photographing spot based on a previous photographing spot where photographing has been performed, and photographing the functional space by taking the predicted next photographing spot as a center, to obtain a corresponding depth image and picture.

In order to generate better virtual 3D model of the house, data collection of the house needs to be performed at a plurality of photographing spots. The selection of a photographing spot usually relies on the photographer's personal experience. As a result, the collected data may be incomplete due to improper selection of a photographing spot, thereby affecting the quality of the generated virtual 3D model of the house, or efficiency of data collection may be low due to selecting a photographing spot for many times.

According to the embodiment of the present disclosure, integrity and/or efficiency of data collection can be improved by predicting a next photographing spot based on previous photographing spot(s) where photographing has been performed, and photographing a functional space by taking the predicted next photographing spot as the center.

Figure 4:
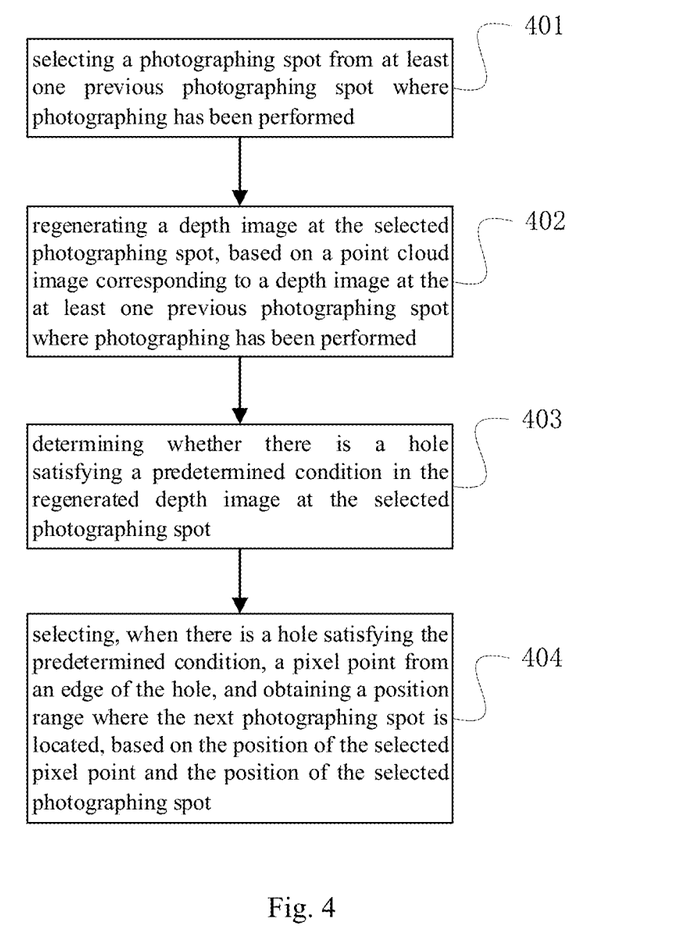
FIG. 4 is a schematic flow diagram of an exemplary method for predicting a next photographing spot based on a previous photographing spot where photographing has been performed according to another embodiment of the present disclosure.

FIG. 4 is a schematic flow diagram of an exemplary method for predicting a next photographing spot based on a previous photographing spot where photographing has been performed according to another embodiment of the present disclosure.

As shown in FIG. 4, predicting the next photographing spot based on the previous photographing spot where photographing has been performed can comprise, for example, the following steps.

In step 401, a photographing spot is selected from at least one previous photographing spot where photographing has been performed.

There may be one or more previous photographing spots where photographing has been performed. In this step, a photographing spot is selected from one or more previous photographing spots where photographing has been performed.

According to an exemplary embodiment, the selected photographing spot can be a latest photographing spot for photographing in the at least one previous photographing spot where photographing has been performed. By prioritizing the latest photographing spot for photographing, consistency in data collection can be kept, and collection efficiency can be improved. Of course, the selected photographing spot can also be any one of the previous photographing spots where photographing has been performed.

In step 402, a depth image at the selected photographing spot is regenerated, based on a point cloud image corresponding to a depth image at the at least one previous photographing spot where photographing has been performed.

More specifically, point cloud images corresponding to depth images of respective photographing spots of the previous photographing spots where photographing has been performed can be stitched and merged to obtain a point cloud image corresponding to the depths image at the previous photographing spots where photographing has been performed, and a depth image at the selected photographing spot is regenerated based on the point cloud image.

For example, it is assumed that there are three previous photographing spots A, B, and C where photographing has been performed. A depth image A1 at the photographing spot A corresponds to a point cloud image A2. A depth image B1 at the photographing spot B corresponds to a point cloud image B2. A depth image C1 at the photographing spot C corresponds to a point cloud image C2. Then, the point cloud images A2, B2, and C2 are stitched and merged to obtain a point cloud image N corresponding to the depth images A1, B1, and C1 at the three previous photographing spots where photographing has been performed. In other words, the point cloud image N obtained by stitching and merging can include depth information included in each of the depth images A1, B1, and C1. It is further assumed that the photographing spot C is selected from the three previous photographing spots A, B, and C where photographing has been performed, then a depth image C12 at the photographing spot C can be regenerated, based on the point cloud image N corresponding to the depth images A1, B1, and C1 at the three previous photographing spots A, B, and C where photographing has been performed.

In terms of the selected photographing spot, there is an original depth image at the photographing spot that is obtained by photographing at the photographing spot. However, data may be missing from the obtained original depth image due to some factors, such as the influence of a photographing device, and the interference of ambient light. By regenerating the depth image at the selected photographing spot based on the point cloud image corresponding to the depth image at the at least one previous photographing spot where photographing has been performed, data in the original depth image can be supplemented by data at other previous photographing spot(s) where photographing has been performed.

Still take the photographing spots A, B, and C described above as an example. Data may be missing from the original depth image C1 at the selected photographing spot C due to some factors. For example, depth information at some positions in the functional space are missing. Due to limitation of view angles of the photographing device, for example, no depth information can be acquired directly above or below the photographing device. Since the depth image C12 at the photographing spot C is regenerated based on the point cloud image N corresponding to the depth images A1, B1, and C1 at the three previous photographing spots A, B, and C where photographing has been performed, the data in the original depth image C1 at the selected photographing spot C can be supplemented by the data at the photographing spots A and B, such that the regenerated depth image C12 can include more depth information, which facilitates subsequent data analysis to predict the next photographing spot.

In step 403, it is determined whether there is a hole satisfying a predetermined condition in the regenerated depth image at the selected photographing spot.

Even if the data in the original depth image at the selected photographing spot can be supplemented by the data at other previous photographing spot(s) where photographing has been performed so as to regenerate a depth image at the selected photographing spot, there may be still one or more holes containing no depth information in the regenerated depth image due to some factors, such as view angles of the photographing device, an effective photographing distance of the photographing device, and a light condition, etc. In step 403, it is determined whether there is a hole satisfying a predetermined condition in the regenerated depth image at the selected photographing spot. For example, firstly, it can be determined whether there is a hole in the regenerated depth image at the selected photographing spot, and then it can be further determined whether the hole satisfies a predetermined condition.

For a depth image, it can be represented in form of a two-dimensional pixel matrix. The value of each matrix element (pixel point) in the pixel matrix represents a corresponding depth value, that is, the distance of the matrix element (pixel point) from a photographing spot in a three-dimensional space. The hole in the depth image can be obtained by determining a set of matrix elements (pixel points) that have a depth value of zero and are adjacent in the pixel matrix of the depth image. For a certain depth image, there may be no hole, or there may be one or more holes. The hole in the depth image can be obtained in various ways. According to an exemplary embodiment, the hole in the regenerated depth image can be obtained by breadth-first search or depth-first search.

According to an exemplary embodiment, the predetermined condition in the above step can comprise: the area of the hole being greater than a predetermined area threshold; and/or, the pixel point at the edge of the hole, that is closest to the selected photographing spot, being within a range of a predetermined threshold distance from the selected photographing spot. For example, for a hole in the regenerated depth image at the selected photographing spot, if the area of the hole is greater than a predetermined area threshold, and/or the pixel point, closest to the selected photographing spot, at the edge of the hole is within the range of the predetermined threshold distance from the selected photographing spot, the hole is determined to be a hole satisfying the predetermined condition.

The area of the hole can be represented by the number of pixel points included in the hole in the pixel matrix of the depth image. The edge of the hole can be composed of pixel points in the pixel matrix of the depth image, that are adjacent to the hole and have depth values that are not zero.

The area threshold of the hole can be determined based on various factors, such as an effective photographing distance of the photographing device, an angle of view of the photographing device, a photographing mechanism of the photographing device, and a light condition. For example, if the depth image is of 1600×800, the area threshold can be selected as 10000, that is, the number of pixel points is 10000. And it is determined whether the area of the hole is greater than the area threshold. It should be noted that, the area threshold is merely exemplary but not restrictive. The appropriate area threshold can be determined as needed.

The range of a threshold distance of the pixel point at the edge of the hole that is closest to the selected photographing spot from the selected photographing spot, can also be determined based on various factors, such as an effective photographing distance of the photographing device, and an angle of view of the photographing device. For example, if the effective photographing distance of the photographing device is 20 cm to 6 m, the range of the threshold distance can be determined as ranging from 3 m to 6 m, and it is determined whether the pixel, closest to the selected photographing spot, at the edge of the hole is within the range of 3 m to 6 m from the selected photographing spot. It should be noted that, the threshold distance range is merely exemplary but not restrictive. The appropriate threshold distance range can be determined as needed.

In step 404, when there is a hole satisfying the predetermined condition, a pixel point is selected from the edge of the hole, and a position range, where the next photographing spot is located, is obtained based on the position of the selected pixel point and the position of the selected photographing spot.

In this step, if it is determined that there is a hole satisfying the predetermined condition in the regenerated depth image, a pixel point can be selected from the edge of the hole, and a position range, where the next photographing spot is located, is obtained based on the position of the selected pixel point and the position of the selected photographing spot, so that the photographer can select a next photographing spot within the position range. As described below, the position range where the next photographing spot is located can be obtained in various ways.

According to an exemplary embodiment, if there are a plurality of holes satisfying the predetermined condition in the regenerated depth image, a pixel point is selected from the edge of each of the holes, and based on the position of the selected pixel points and the position of the selected photographing spot, a plurality of position ranges where the next photographing spot may be located can be obtained. In this case, the photographer can select one range from the plurality of position ranges as needed, and further select the next photographing spot within the selected position range.

According to an exemplary embodiment, the pixel point selected from the edge of the hole can be a pixel point, closest to the selected photographing spot, at the edge of the hole. The pixel point at the edge of the hole that is closest to the selected photographing spot is generally a pixel point of all the pixel points at the edge of the hole that has the minimum depth value. Of course, the other pixel points at the edge of the hole can also be selected. For example, any pixel point can be selected from all the pixel points at the edge of the hole satisfying the predetermined condition as needed, so as to determine the position range where the next photographing spot is located.

It is determined whether the hole in the regenerated depth image at the selected photographing spot satisfies the predetermined condition, and the position range where the next photographing spot is located is obtained based on the hole satisfying the predetermined condition, which helps to improve the efficiency of data processing and/or improve the accuracy of data analysis. For example, the amount of calculation can be reduced by processing a hole that has an area greater than a predetermined area threshold while ignoring a hole that has a too small area, thereby improving efficiency of data processing. The accuracy of data analysis can be improved by processing a hole, at the edge of which the pixel point closest to the selected photographing spot is within the predetermined threshold distance range. For example, the effective photographing distance of the photographing device may cause a hole at a position relatively far from the selected photographing spot. In some cases, due to the structure of a house itself, e.g., there is a balcony within a relatively close distance from the selected photographing spot, a large area of hole may exist within the distance. Such a hole that is too far from or too close to the selected photographing spot may interfere with accurate data analysis for obtaining a reasonable position range where the next photographing spot is located. Thus, the accuracy of data analysis can be improved by setting a range of a threshold distance from the selected photographing spot and processing a hole, at the edge of which the pixel point closest to the selected photographing spot is within the threshold distance range.

As described above, in the process of predicting the next photographing spot based on the previous photographing spot(s) where photographing has been performed, a depth image at the selected photographing spot can be regenerated based on a point cloud image corresponding to the depth image at the at least one previous photographing spot where photographing has been performed. The depth image can be regenerated in various ways as needed.

According to an exemplary embodiment, regenerating the depth image at the selected photographing spot, based on the point cloud image corresponding to the depth image at the at least one previous photographing spot where photographing has been performed, can comprises: obtaining a point cloud image corresponding to the selected photographing spot, from the point cloud image corresponding to the depth image at the at least one previous photographing spot where photographing has been performed, and regenerating the depth image at the selected photographing spot from the point cloud image corresponding to the selected photographing spot.

Still take the previous photographing spots A, B, and C where photographing has been performed described above as an example. It is assumed that there are three previous photographing spots A, B, and C where photographing has been performed. A depth image A1 at the photographing spot A corresponds to a point cloud image A2. A depth image B1 at the photographing spot B corresponds to a point cloud image B2. A depth image C1 at the photographing spot C corresponds to a point cloud image C2. Then, the point cloud images A2, B2, and C2 are stitched and merged to obtain a point cloud image N corresponding to the depth images A1, B1, and C1 at the three previous photographing spots where photographing has been performed. It is further assumed that the photographing spot C is selected from the three previous photographing spots A, B, and C where photographing has been performed, then a point cloud image C22 corresponding to the selected photographing spot C can be obtained from the point cloud image N corresponding to the depth images A1, B1, and C1 at the three previous photographing spots A, B, and C where photographing has been performed, and a depth image C12 at the selected photographing spot C is regenerated from the point cloud image C22 corresponding to the selected photographing spot C.

The point cloud image corresponding to the selected photographing spot can be obtained from the point cloud image corresponding to the depth image at the at least one previous photographing spot in various ways. According to an exemplary embodiment, obtaining a point cloud image corresponding to the selected photographing spot from the point cloud image corresponding to the depth image at the at least one previous photographing spot where photographing has been performed can comprise: selecting a set of points satisfying a preset condition from all points in the point cloud image corresponding to the depth image at the at least one previous photographing spot where photographing has been performed as the point cloud image corresponding to the selected photographing spot.

The preset condition can be, for example, a condition associated with a distance. According to an exemplary embodiment, the preset condition can be: a point in the point cloud image corresponding to the depth image at the at least one previous photographing spot where photographing has been performed being within a predetermined distance from the selected photographing spot. For example, all the points in the point cloud image corresponding to the depth image at the at least one previous photographing spot where photographing has been performed can be traversed, and a set of points that are within a predetermined distance from the selected photographing spot in all the points in the point cloud image is used as a point cloud image corresponding to the selected photographing spot. The predetermined distance can be, for example, an effective photographing distance of the photographing device or a certain distance less than the effective photographing distance. Considering specific structure of a house and other factors, a specific value of the predetermined distance can be determined as needed. According to another exemplary embodiment, the preset condition can be: a point in the point cloud image corresponding to the depth image at the at least one previous photographing spot where photographing has been performed being inside a regular polyhedron, which takes the selected photographing spot as the center and takes a predetermined length as a side length.

Still take the previous photographing spots A, B, and C where photographing has been performed described above as an example. All the points in the point cloud image N corresponding to the depth images A1, B1, and C1 at the photographing spots A, B, and C can be traversed, and in all the points in the point cloud image N, a set of points that are within a predetermined distance from the selected photographing spot C is used as the point cloud image C22 corresponding to the selected photographing spot C.

The depth image at the selected photographing spot can be regenerated from the point cloud image corresponding to the selected photographing spot in various ways. For example, each point in the point cloud image corresponding to the selected photographing spot can be mapped into a pixel matrix corresponding to the depth image at the selected photographing spot.

Figure 5:
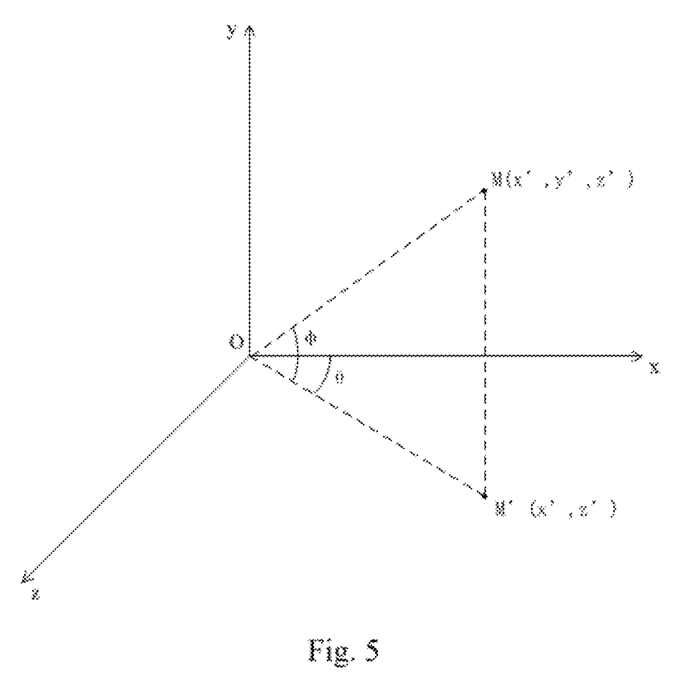
FIG. 5 is a schematic spatial coordinate diagram illustrating the principle regarding how a depth image is generated based on a point cloud image.

FIG. 5 is a schematic spatial coordinate diagram illustrating the principle regarding how a depth image is generated based on a point cloud image.

As shown in FIG. 5, the selected photographing spot is located at the origin O of a rectangular coordinate system consisting of an x axis, a y axis, and a z axis. M is a point in the point cloud image corresponding to the selected photographing spot, and its three-dimensional coordinates in the rectangular coordinate system are (x', y', z').

In order to map the point M to the pixel matrix corresponding to the depth image at the selected photographing spot, angles $\varphi$ (the angle ranging from $-\pi/2$ to $\pi/2$) and $\theta$ (the angle ranging from 0 to $2\pi$) as shown in FIG. 5 are calculated. $\varphi$ is an angle between a line connecting point M to the origin O and the x-z plane, and $\theta$ is an angle between a line connecting a projection point M' of point M on the x-z plane to the origin O and the x axis.

It is assumed that the depth image has a length of W pixel points and a height of H pixel points, the coordinate position (p, q) of point M in the pixel matrix of the depth image can be calculated as follows.

$$p=(W*\theta)/2\pi$$

$$q=(H*(\varphi+\pi/2))/\pi$$

The calculated values of p and q are rounded off. The range of p is [0, W−1], and the range of q is [0, H−1]. The values beyond W−1 or H−1 are ignored. In other words, the angle range $-\pi/2$ to $\pi/2$ of $\varphi$ is mapped to 0 to H, and the angle range 0 to $2\pi$ of $\theta$ is mapped to 0 to W. If the values of $\varphi$ and $\theta$ of a point in the point cloud image are known, the corresponding coordinate position (p, q) of the point in the pixel matrix of the depth image can be calculated.

A depth value of point M at the coordinate position (p, q) in the pixel matrix of the depth image can be obtained by calculating the distance between point M and the origin O.

It should be noted that, the approach for regenerating the depth image from the point cloud image corresponding to the selected photographing spot described above is merely illustrative but not restrictive. Other approaches can also be used to obtain the depth image as needed. For example, the depth image can be obtained from the point cloud image by using a RangeImage module of a PCL library. With Range- Image, three-dimensional spatial point coordinates corresponding to each pixel can also be obtained from the depth image, and then a point cloud image can be obtained. Point cloud images can be stitched by using an ICP-related point cloud registration algorithm of the PCL library.

As described above, since the point cloud image corresponding to the depth image(s) at the previous photographing spot(s) where photographing has been performed may include data at other photographing spots, the point cloud image, which corresponds to the selected photographing spot and is obtained from the point cloud image corresponding to the depth image(s) at the previous photographing spot(s) where photographing has been performed, may also include data at these other photographing spots, which may result in presence of a plurality of depth values corresponding to a same pixel point in the pixel matrix of the regenerated depth image. The plurality of depth values come from different photographing spots.

Still take the schematic spatial coordinate diagram shown in FIG. 5 as an example. It is assumed that the point cloud image corresponding to the selected photographing spot includes data at another photographing spot, and the data results in presence of another point on the extension line of the line connecting point M to the origin O in an O-M direction. Since the values of angles φ and θ corresponding to this another point are the same as those of point M, when this another point is mapped into the pixel matrix of the depth image, the coordinate position (p, q) of the corresponding pixel point of this another point in the pixel matrix of the depth image is also the same as those of point M. Thus, there are a plurality of depth values corresponding to the same pixel point in the pixel matrix, these depth values coming from different photographing spots.

The plurality of depth values corresponding to the same pixel point may be caused by redundant data at other photographing spots except the selected photographing spot. In order to reduce or eliminate the redundant data at other photographing spots, according to an exemplary embodiment, after each point in the point cloud image corresponding to the selected photographing spot is mapped into the pixel matrix corresponding to the depth image, when there are a plurality of depth values corresponding to a same pixel point in the pixel matrix, the minimum depth value in the plurality of depth values is used as the depth value of the pixel point. From the perspective of a spatial occlusion relationship, a point closer to the selected photographing spot may occlude a point farther from the spot, and therefore, the minimum depth value can be selected from the pixel matrix of the depth image.

As described above, when there is a hole satisfying the predetermined condition, a pixel point can be selected from the edge of the hole, and a position range where the next photographing spot is located is obtained based on the position of the selected pixel point and the position of the selected photographing spot.

The position range where the next photographing spot is located can be obtained in various ways. According to an exemplary embodiment, obtaining the position range where the next photographing spot is located, based on the position of the selected pixel point and the position of the selected photographing spot, can comprise: obtaining a position of a projection point of the selected pixel point on a two-dimensional plane where a floor of the functional space is located, from three-dimensional coordinates of the selected pixel point in the point cloud image corresponding to the selected photographing spot; and obtaining the position range where the next photographing spot is located, based on the position of the projection point and the position of the selected photographing spot.

Still take the schematic spatial coordinate diagram shown in FIG. 5 as an example. It is assumed that pixel point M at the edge of the hole is selected, and its three-dimensional coordinates in the point cloud image corresponding to the selected photographing spot are (x', y', z'). Assuming that the two-dimensional plane where the floor of the functional space is located is an x-z plane, the position of projection point M' of point M on the two-dimensional plane (x-z plane) where the floor of the functional space is located can be obtained from the three-dimensional coordinates (x', y', z') of point M, and the position of projection point M' can be represented by two-dimensional coordinates (x', z') of point M' in the x-z plane.

After the position of the projection point of the selected pixel point at the edge of the hole on the two-dimensional plane where the floor of the functional space is located is obtained, the position range where the next photographing spot is located can be obtained in various ways, based on the position of the projection point and the position of the selected photographing spot.

For example, a simple way is to use the midpoint of the line connecting the projection point to the selected photographing spot as the position range where the next photographing spot is located. Since there may be objects in the functional space of the house, e.g., a wardrobe, a bed, a dining table, etc., in some cases, the midpoint of the line connecting the projection point to the selected photographing spot cannot be used as a spot for photographing. For example, the midpoint is exactly at the position of the wardrobe. Thus, according to an exemplary embodiment, the position range of a certain line segment on the line connecting the projection point to the selected photographing spot can be used as the position range where the next photographing spot is located. According to another exemplary embodiment, circles can be respectively drawn on the two-dimensional plane where the floor of the functional space is located, by using the selected photographing spot and the projection point as centers of the circles, respectively, based on a predetermined radius value, and the overlapping portion of the two circles can be determined as the position range where the next photographing spot is located. The predetermined radius value can be determined as needed. For example, half of the effective photographing distance of the photographing device is used as the predetermined radius value. According to a further exemplary embodiment, patterns in other shapes can be respectively drawn on the two-dimensional plane where the floor of the functional space is located, by using the selected photographing spot and the projection point as centers, respectively, based on a predetermined size, and the overlapping portion of the two patterns is used as the position range where the next photographing spot is located. By determining the position range where the next photographing spot is located rather than a precise position, reasonability of predicting the next photographing spot can be improved to some extent.

In some cases, there may be no hole satisfying the predetermined condition in the regenerated depth image at the selected photographing spot. In such cases, a photographing spot can be reselected from the previous photographing spots where photographing has been performed, and steps 402, 403, and 404 as shown in FIG. 4 are performed for the reselected photographing spot. Hence, according to an exemplary embodiment of the present disclosure, predicting the next photographing spot based on the previous photographing spot(s) where photographing has been performed can further comprise: when there is no hole satisfying the predetermined condition, determining whether there is unselected photographing spot(s) in the at least one previous photographing spot where photographing has been performed; and when there is unselected photographing spot(s), reselecting a photographing spot from the at least one previous photographing spot where photographing has been performed. Therefore, all the previous photographing spots where photographing has been performed can be traversed, through the above-mentioned approach, until there is no hole satisfying the predetermined condition in all the traversed photographing spots. The previous photographing spots where photographing has been performed can be traversed, for example, in a reverse order of a photographing order, that is, from the latest photographing spot for photographing in the previous photographing spots where photographing has been performed to an initial photographing spot for photographing.

Figure 6:
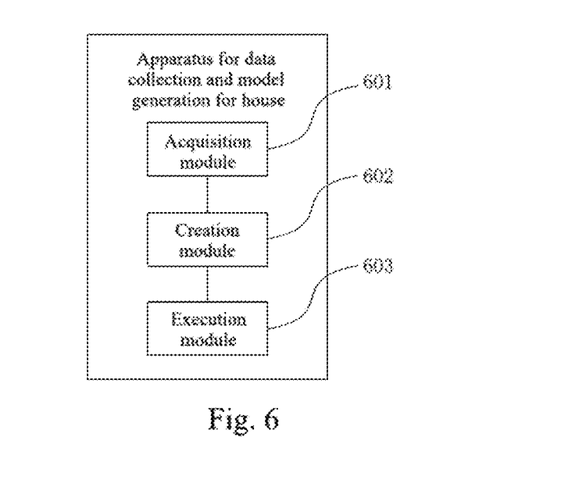
FIG. 6 is a structural block diagram of an apparatus for data collection and model generation of a house according to another embodiment of the present disclosure.

FIG. 6 is a structural block diagram of an apparatus for data collection and model generation of a house according to another embodiment of the present disclosure. Referring to FIG. 6, the apparatus for data collection and model generation of a house comprises an acquisition module 601, a creation module 602, and an execution module 603.

The acquisition module 601 is configured to acquire collected depth images and pictures of each of at least one functional space of a preset house;

the creation module 602 is configured to create a virtual 3D model of the preset house based on the depth images of the at least one functional space, and generate a panoramic image of each of the at least one functional space based on the pictures of the functional space; and the execution module 603 is configured to send, when request information indicating displaying the preset house is received, the virtual 3D model of the preset house or a panoramic image of a target functional space corresponding to the request information, according to the request information.

The apparatus for data collection and model generation of a house provided in this embodiment is applicable to the method for data collection and model generation of a house provided in the above embodiments, which will not be described herein again.

This embodiment provides an apparatus for data collection and model generation of a house. According to the apparatus, when a virtual model of a house is to be established, both collected depth images of the house and pictures of the house are acquired. A virtual three-dimensional model of the house is created by using the depth images, and a panoramic image of each functional space is generated by using the pictures. When a user needs to learn about the structure of the house, the user can view the virtual three-dimensional model created from the depth images; and when the user needs to learn about specific details of a functional space, the user can view the panoramic image of the functional space. Hence, the details of each functional space of the house can be displayed while the structure of the house is displayed, which helps the user to fully learn about the house.

Figure 7:
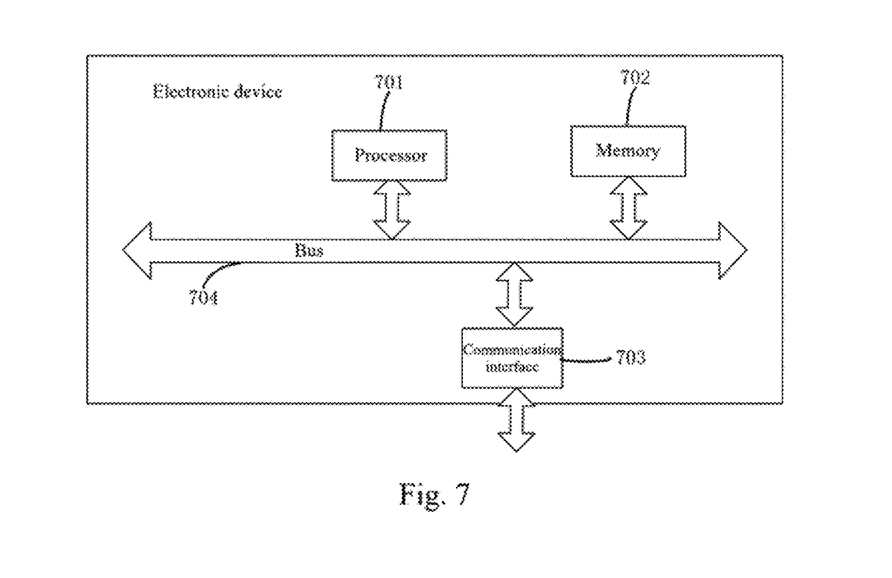
FIG. 7 is a structural block diagram of an electronic device according to another embodiment of the present disclosure.

FIG. 7 is a structural block diagram of an electronic device according to another embodiment of the present disclosure.

Referring to FIG. 7, the electronic device includes a processor 701, a memory 702, a communication interface 703, and a bus 704.

The processor 701, the memory 702, and the communication interface 703 communicate with one another through the bus 704.

The communication interface 703 is used for information transmission between the electronic device and a communication apparatus of a terminal device.

The processor 701 is configured to execute program instructions in the memory 702 to perform the methods provided in the embodiments described above. The method comprises, for example: acquiring collected depth images and pictures of each of at least one functional space of a preset house; creating a virtual 3D model of the preset house based on the depth images of the at least one functional space, and generating a panoramic image of each of the at least one functional space based on the pictures of the functional space; and, sending, when request information indicating displaying the preset house is received, the virtual 3D model of the preset house or a panoramic image of a target functional space corresponding to the request information, according to the request information.

An embodiment provides a non-transitory computer readable storage medium storing computer instructions that cause a computer to perform the methods provided in the embodiments described above, for example, comprising: acquiring collected depth images and pictures of each of at least one functional space of a preset house; creating a virtual 3D model of the preset house based on the depth images of the at least one functional space, and generating a panoramic image of each of the at least one functional space based on the pictures of the functional space; and, sending, when request information indicating displaying the preset house is received, the virtual 3D model of the preset house or a panoramic image of a target functional space corresponding to the request information, according to the request information.

The embodiment provides a computer program product comprising a computer program stored on a non-transitory computer readable storage medium, the computer program including program instructions that, when executed by a computer, cause the computer to perform the methods provided in the embodiments described above, for example, comprising: acquiring collected depth images and pictures of each of at least one functional space of a preset house; creating a virtual 3D model of the preset house based on the depth images of the at least one functional space, and generating a panoramic image of each of the at least one functional space based on the pictures of the functional space; and, sending, when request information indicating displaying the preset house is received, the virtual 3D model of the preset house or a panoramic image of a target functional space corresponding to the request information, according to the request information.

Those of ordinary skill in the art can understand that all or some of the steps of the above method embodiments can be implemented by hardware(s) relating to program instructions. The program can be stored in a computer readable storage medium. When the program is executed, the steps of the above method embodiments are executed. The storage medium can include various media capable of storing program codes, such as an ROM, a RAM, a magnetic disk, or an optical disk.

The embodiments of the electronic device described above are merely schematic, wherein units illustrated as separate components can be or cannot be physically separated, and the components illustrated as units can be or cannot be physical units. That is to say, the components can be positioned at one place or distributed on a plurality of network units. The object(s) of solutions of embodiments can be achieved by selecting some of or all of the modules therein according to actual needs. Those of ordinary skill in the art can understand and implement the solutions without any creative effort.

Through the description of the above embodiments, those skilled in the art can clearly understand that the embodiments can be implemented by software and necessary general hardware platforms. Of course, the embodiments can also be implemented in hardware. Based on such understanding, the above technical solutions substantially, or the part(s) thereof making contributions to the prior art, can be embodied in the form of a software product, and the computer software product can be stored in a computer readable storage medium, such as an ROM/RAM, a magnetic disk, or an optical disk, which includes instructions to enable a computer device (which can be a personal computer, a server, or a network device, etc.) to execute the methods in embodiments or parts of the embodiments.

Finally, it should be noted that, the above embodiments are only for describing, but not limiting, the technical solutions of embodiments of the present disclosure. Although embodiments of the present disclosure have been described in detail with reference to the above embodiments, those of ordinary skill in the art should understood that the technical solutions stated in the above embodiments can still be modified, or some or all of the technical features therein can be equivalently substituted; and such modifications or substitutions do not make the essence of the corresponding technical solutions depart from the scope of the technical solutions of each of the embodiments of the present disclosure.

A first aspect relates to a method for data collection and model generation of a house, which comprises: acquiring collected depth images and pictures of each functional space of a preset house; creating a 3D model of the preset house based on the collected depth images corresponding to each functional space, and generating a panoramic image of each functional space based on the pictures corresponding to the functional space; and, sending, when request information indicating displaying the preset house is received, the 3D model or a panoramic image of a target functional space corresponding to the request information, according to the request information.

A second aspect relates to the method according to the first aspect, wherein acquiring collected depth images and pictures of each functional space of the preset house comprises: for each functional space of the preset house, acquiring each photographing spot in the functional space, and photographing the functional space at a plurality of angles, by taking the photographing spot as a center, to obtain the depth images and the pictures of the functional space, the depth images being obtained by photographing with a depth camera.

A third aspect relates to the method according to the second aspect, wherein photographing the functional space at the plurality of angles, by taking the photographing spot as the center to obtain the depth images of the functional space comprises: stitching and merging point cloud images of the functional space, that are obtained by photographing the functional space at the plurality of angles by taking the photographing spot as the center, and when a stitched and merged point cloud image covers each corner of the functional space, taking the stitched and merged point cloud image as the depth image of the functional space that is obtained by photographing the functional space at the plurality of angles by taking the photographing spot as the center; and when the stitched and merged point cloud image does not cover each corner of the functional space, performing re-photographing by taking the photographing spot as the center or reselecting a photographing spot to perform re-photographing, until a point cloud image covering each corner of the functional space is obtained, and taking the point cloud image as the depth image of the functional space that is obtained by photographing the functional space at the plurality of angles by taking the photographing spot as the center.

A fourth aspect relates to the method according to the third aspect, wherein after taking the point cloud image as the depth image of the functional space that is obtained by photographing the functional space at the plurality of angles by taking the photographing spot as the center, the method further comprises: at the photographing spot where the point cloud image is obtained, photographing the functional space at the plurality of angles, to obtain the pictures by photographing the functional space at the plurality of angles by taking the photographing spot as the center.

A fifth aspect relates to the method according to the first aspect, wherein, sending, when request information indicating displaying the preset house is received, the 3D model or the panoramic image of the target functional space corresponding to the request information, according to the request information, comprises: sending, when the request information indicates displaying the 3D model of the preset house, the 3D model to a terminal device corresponding to the request information; and sending, when the request information indicates displaying a panoramic image of the target functional space, a panoramic image at a preset default angle of view corresponding to the target functional space to the terminal device.

A sixth aspect relates to the method according to the fifth aspect, wherein, after sending, when the request information indicates displaying the panoramic image of the target functional space, the panoramic image at the preset default angle of view corresponding to the target functional space to the terminal device, the method further comprises: acquiring, when information indicating changing a current angle of view for display is received, a changed target angle of view, and sending a panoramic image corresponding to the target angle of view to the terminal device, wherein the information indicating changing the current angle of view for display comprises movement adjustment or zoom adjustment of the current angle of view for display, the movement adjustment being implemented by sliding a screen to left or right on the terminal device, and the zoom adjustment being implemented by a zoom operation on the terminal device.

A seventh aspect relates to the method according to the sixth aspect, wherein after sending, when the request information indicates displaying the panoramic image of the target functional space, the panoramic image at the preset default angle of view corresponding to the target functional space to the terminal device, the method further comprises: sending, when information indicating skip to another functional space is received, a panoramic image at a preset default angle of view corresponding to said another functional space to the terminal device.

An eighth aspect relates to an apparatus for data collection and model generation of a house, the apparatus comprising: an acquisition module configured to acquire collected depth images and pictures of each functional space of a preset house; a creation module configured to create a 3D model of the preset house based on the collected depth images corresponding to each functional space, and generating a panoramic image of each functional space based on the pictures corresponding to the functional space; and an execution module configured to send, when request information indicating displaying the preset house is received, the 3D model or a panoramic image of a target functional space corresponding to the request information, according to the request information.

A ninth aspect relates to an electronic device, which comprises at least one processor, at least one memory, a communication interface, and a bus, wherein the processor, the memory, and the communication interface communicate with one another through the bus; the communication interface is used for information transmission between the electronic device and a communication apparatus of a terminal device; and the memory stores program instructions executable by the processor, the processor executing the program instructions to perform the method according to any one of the first to seventh aspects.

A tenth aspect relates to a non-transitory computer readable storage medium storing computer instructions, that cause a computer to perform the method according to any one of the first to seventh aspects.

The invention claimed is:

1. A computer-implemented method for data collection and model generation of a house, comprising:
   employing a processor that facilitates execution of computer executable instructions stored on a non-transitory computer readable medium to implement operations, the operations comprising:
   acquiring collected depth images and pictures of each of at least one functional space of a preset house;
   creating a virtual 3D model of the preset house according to the depth images of the at least one functional space, and generating a panoramic image of each of the at least one functional space according to the pictures of the functional space; and
   sending, when request information indicating displaying the preset house is received, the virtual 3D model of the preset house or a panoramic image of a target functional space corresponding to the request information, according to the request information,
   wherein acquiring the collected depth images and the pictures of each of the at least one functional space of the preset house comprises: for each of the at least one functional space, photographing the functional space by taking a plurality of photographing spots in the functional space as centers, respectively, to obtain the depth images and the pictures of the functional space;
   wherein photographing the functional space by taking the pluralityof photographing spots in the functional space as the centers, respectively, to obtain the depth images and the pictures of the functional space, comprises: predicting a next photographing spot based on a previous photographing spot where photographing has been performed, and photographing the functional space by taking the predicted next photographing spot as a center, to obtain a corresponding depth image and picture;
   wherein predicting the next photographing spot based on the previous photographing spot where photographing has been performed comprises:
   selecting a photographing spot from at least one previous photographing spot where photographing has been performed;
   regenerating a depth image at the selected photographing spot, based on a point cloud image corresponding to a depth image at the at least one previous photographing spot where photographing has been performed;
   determining whether there is a hole satisfying a predetermined condition in the regenerated depth image at the selected photographing spot; and
   selecting, when there is a hole satisfying the predetermined condition, a pixel point from an edge of the hole, and obtaining a position range where the next photographing spot is located, based on the position of the selected pixel point and the position of the selected photographing spot;
   wherein regenerating the depth image at the selected photographing spot, based on the point cloud image corresponding to the depth image at the at least one previous photographing spot where photographing has been performed, comprises: obtaining a point cloud image corresponding to the selected photographing spot, from the point cloud image corresponding to the depth image at the at least one previous photographing spot where photographing has been performed, and regenerating the depth image at the selected photographing spot from the point cloud image corresponding to the selected photographing spot; and
   wherein regenerating the depth image at the selected photographing spot from the point cloud image corresponding to the selected photographing spot comprises:
   mapping each point in the point cloud image corresponding to the selected photographing spot into a pixel matrix corresponding to the depth image; and
   determining, when there are a plurality of depth values corresponding to a same pixel point in the pixel matrix, a minimum depth value in the plurality of depth values as a depth value of the pixel point.

2. The method of claim 1, wherein photographing the functional space by taking the plurality of photographing spots in the functional space as the centers, respectively, to obtain the depth images and the pictures of the functional space, comprises:
   stitching and merging a point cloud image corresponding to a depth image that is obtained by photographing the functional space by taking a current photographing spot as a center, with a point cloud image corresponding to a depth image at a previous photographing spot where photographing has been performed, and obtaining, when the stitched and merged point cloud image covers each corner of the functional space, the depth images of the functional space based on the depth image at the current photographing spot and the depth image at the previous photographing spot where photographing has been performed; and
   performing re-photographing by taking the current photographing spot as the center or reselecting a photographing spot to perform photographing, when the stitched and merged point cloud image does not cover each corner of the functional space, until a point cloud image covering each corner of the functional space is obtained, and obtaining the depth images of the functional space based on depth images at all photographing spots where photographing has been performed.

3. The method of claim 2, further comprising:
   photographing the functional space by taking each photographing spot where photographing has been performed to obtain a depth image as a center, to obtain a picture of the functional space that corresponds to each photographing spot where photographing has been performed to obtain the depth image.

4. The method of claim 1, wherein sending, when the request information indicating displaying the preset house is received, the virtual 3D model of the preset house or the panoramic image of the target functional space corresponding to the request information, according to the request information, comprises:

sending, when the request information indicates displaying the virtual 3D model of the preset house, the virtual 3D model of the preset house to a terminal device corresponding to the request information; and     sending, when the request information indicates displaying the panoramic image of the target functional space, a panoramic image at a preset default angle of view corresponding to the target functional space to the terminal device.

5. The method of claim 4, further comprising: after sending, when the request information indicates displaying the panoramic image of the target functional space, the panoramic image at the preset default angle of view corresponding to the target functional space to the terminal device,     acquiring, when information indicating changing a current angle of view for display is received, a changed target angle of view, and sending a panoramic image corresponding to the target angle of view to the terminal device,     wherein the information indicating changing the current angle of view for display comprises movement adjustment or zoom adjustment of the current angle of view for display, the movement adjustment being implemented by sliding a screen to left or right on the terminal device, and the zoom adjustment being implemented by a zoom operation on the terminal device.

6. The method of claim 5, wherein the at least one functional space comprises a plurality of functional spaces, and the method further comprises: after sending, when the request information indicates displaying the panoramic image of the target functional space, the panoramic image at the preset default angle of view corresponding to the target functional space to the terminal device,     sending, when information indicating skip to another functional space is received, a panoramic image at a preset default angle of view corresponding to said another functional space to the terminal device.

7. The method of claim 1, wherein obtaining the position range where the next photographing spot is located, based on the position of the selected pixel point and the position of the selected photographing spot, comprises:

obtaining a position of a projection point of the selected pixel point on a two-dimensional plane where a floor of the functional space is located, from three-dimensional coordinates of the selected pixel point in the point cloud image corresponding to the selected photographing spot; and     obtaining the position range where the next photographing spot is located, based on the position of the projection point and the position of the selected photographing spot.

8. The method of claim 1, wherein the predetermined condition comprises:

the area of the hole being greater than a predetermined area threshold; and/or     the pixel point at the edge of the hole, that is closest to the selected photographing spot, being within a range of a predetermined threshold distance from the selected photographing spot.

9. The method of claim 1, wherein the selected pixel point is the pixel point at the edge of the hole that is closest to the selected photographing spot.

10. The method of claim 1, wherein the selected photographing spot is a latest photographing spot for photographing in the at least one previous photographing spot where photographing has been performed.

11. An electronic device, comprising:

at least one processor, at least one memory, a communication interface and a bus, wherein     the processor, the memory, and the communication interface communicate with one another through the bus;

the communication interface is used for information transmission between the electronic device and a communication apparatus of a terminal device; and     the memory stores program instructions executable by the processor, the processor executing the program instructions to perform the method of claim 1.

12. A non-transitory computer readable storage medium, storing computer instructions that cause a computer to perform the method of claim 1.

* * * * *